US010955961B2

(12) United States Patent
Lewis

(10) Patent No.: US 10,955,961 B2
(45) Date of Patent: Mar. 23, 2021

(54) DISPLAY USER INTERFACE, AND RELATED SYSTEMS, METHODS AND DEVICES

(71) Applicant: Microchip Technology Incorporated, Chandler, AZ (US)

(72) Inventor: Lowry DuRant Lewis, Raleigh, NC (US)

(73) Assignee: Microchip Technology Incorporated, Chandler, AZ (US)

( * ) Notice: Subject to any disclaimer, the term of this patent is extended or adjusted under 35 U.S.C. 154(b) by 46 days.

(21) Appl. No.: 16/001,689

(22) Filed: Jun. 6, 2018

(65) Prior Publication Data

US 2019/0243505 A1 Aug. 8, 2019

Related U.S. Application Data

(60) Provisional application No. 62/625,629, filed on Feb. 2, 2018.

(51) Int. Cl.
*G06F 3/041* (2006.01)
*G06F 3/0488* (2013.01)
*G06F 3/0484* (2013.01)
*G06F 1/16* (2006.01)

(52) U.S. Cl.
CPC ............ *G06F 3/0416* (2013.01); *G06F 1/169* (2013.01); *G06F 3/0488* (2013.01); *G06F 3/04847* (2013.01); *G06F 3/04883* (2013.01); *G06F 2203/04101* (2013.01)

(58) Field of Classification Search
CPC ...... G06F 3/041; G06F 3/0414; G06F 3/0416; G06F 3/04847; G06F 3/04883

USPC .................................................. 345/173, 174
See application file for complete search history.

(56) References Cited

U.S. PATENT DOCUMENTS

| 7,123,243 | B2* | 10/2006 | Kawasaki | G02F 1/13338 |
| | | | | 345/173 |
| 9,310,905 | B2* | 4/2016 | Luo | G06F 3/041 |
| 9,727,082 | B2 | 8/2017 | Elias | |
| 9,820,258 | B2* | 11/2017 | Yamasaki | H04L 41/22 |
| 10,152,162 | B1* | 12/2018 | Bokma | G06F 3/044 |
| 2002/0118175 | A1 | 8/2002 | Liebenow et al. | |
| 2003/0234768 | A1 | 12/2003 | Rekimoto et al. | |
| 2007/0268261 | A1* | 11/2007 | Lipson | G06F 1/1647 |
| | | | | 345/169 |

(Continued)

FOREIGN PATENT DOCUMENTS

EP 2960776 A2 12/2015

OTHER PUBLICATIONS

International Search Report for International Application No. PCT/US2019/015248, dated Jun. 5, 2019, 4 pages.

(Continued)

*Primary Examiner* — Calvin C Ma
(74) *Attorney, Agent, or Firm* — TraskBritt

(57) ABSTRACT

Embodiments described in this disclosure relate, generally, to a touch user interface (UI) that interacts with, and may be used to manipulate, a graphical user interface (GUI) of a display utility presented at a graphical overlay, and systems and methods for implementing the same. Some embodiments of the disclosure may be incorporated into display systems, including bezel-less display systems.

30 Claims, 13 Drawing Sheets

(56) References Cited

U.S. PATENT DOCUMENTS

| | | | |
|---|---|---|---|
| 2013/0155070 A1* | 6/2013 | Luo | G06T 11/20 |
| | | | 345/441 |
| 2013/0240804 A1 | 9/2013 | Pagba et al. | |
| 2013/0278552 A1 | 10/2013 | Kamin-Lyndgaard | |
| 2014/0337786 A1* | 11/2014 | Luo | G06F 3/041 |
| | | | 715/773 |

OTHER PUBLICATIONS

International Written Opinion for International Application No. PCT/US2019/015248, dated Jun. 5, 2019, 11 pages.
Alexander, Steve; Canopy tries again with pressure-sensitie iPhone case; startribune.com; Jan. 13, 2014, 2 pages; startribune.com/canopy-tries-again-with-pressure-sensitive-iphone-case/239710861/.
Baldwin, Roberto; Capacitive Touch Case Makes Your iPhone Very Sensitive; wired.com; Oct. 11, 2012; 2 pages; wired.com/2012/10/control-iphone-from-the-back-with-capacitive-touch-case/.

* cited by examiner (State Of The Art)

(State Of The Art)

DISPLAY USER INTERFACE, AND RELATED SYSTEMS, METHODS AND DEVICES

CROSS-REFERENCE TO RELATED APPLICATION

This application claims the benefit under 35 U.S.C. § 119(e) of U.S. Provisional Patent Application Ser. No. 62/625,629, filed Feb. 2, 2018, the disclosure of which is hereby incorporated herein in its entirety by this reference.

TECHNICAL FIELD

Embodiments of the present disclosure relate, generally, to user interfaces, and in certain embodiments, to onscreen display utility overlays that incorporate user interfaces.

BACKGROUND

Conventional display systems (e.g., monitors, televisions, etc.) often include physical push buttons (typically a switch mechanism activated by pushing on it—e.g., to bias the switch—and a spring may return the mechanism to an inactive position) for setting line input, brightness/contrast, video settings, audio settings, etc. A conventional display system may include push buttons on the side of display's bezel, such as push buttons 102 shown in FIG. 1A or on the top of the display's bezel, such as push buttons 104 shown FIG. 1B. A user of a display system may use the push buttons to interact with the display system's utility application (also referred to herein as simply a "display utility"). A display utility is typically a software or firmware application that manages certain characteristics of a display system (e.g., signal input selection, display brightness, volume, resolution, etc.), typically by setting one or more values associated with such characteristics. A user may interact with a utility application through a combination of the push buttons and a graphical user interface (GUI) presented at a display of a display system, such as the display utility GUI shown in FIG. 2A.

Push buttons at the bezel put a lower limit on the bezel dimensions, that is, the buttons are the largest item on the bezel. Further, the switches that comprise the buttons take up space within the bezel. Accordingly, the buttons on conventional displays constrain the ability to manufacture thin displays.

Other disadvantages and deficiencies with display systems may exist. The foregoing description is the state of the art as known to the inventor of this disclosure and is not, nor should it be construed to be, admitted prior art.

BRIEF DESCRIPTION OF THE DRAWINGS

The purposes and advantages of the embodiments of the present disclosure will be apparent to a person of ordinary skill in the art from the detailed description in conjunction with the appended drawings as follows.

DETAILED DESCRIPTION

Figure 1A:
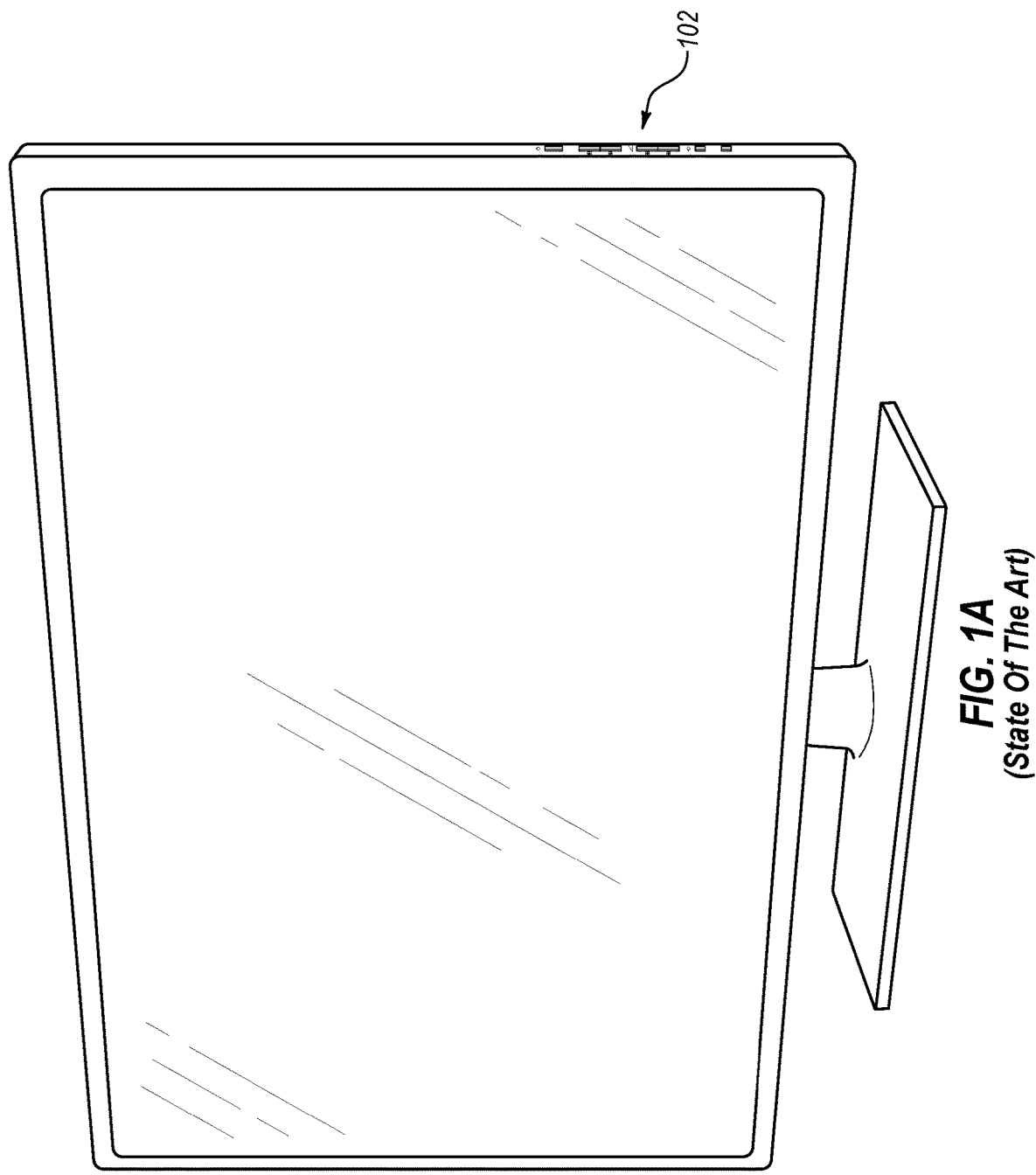
FIGS. 1A and 1B show, respectively, push buttons on the side and top of the bezel of a conventional display system.
Figure 1B:
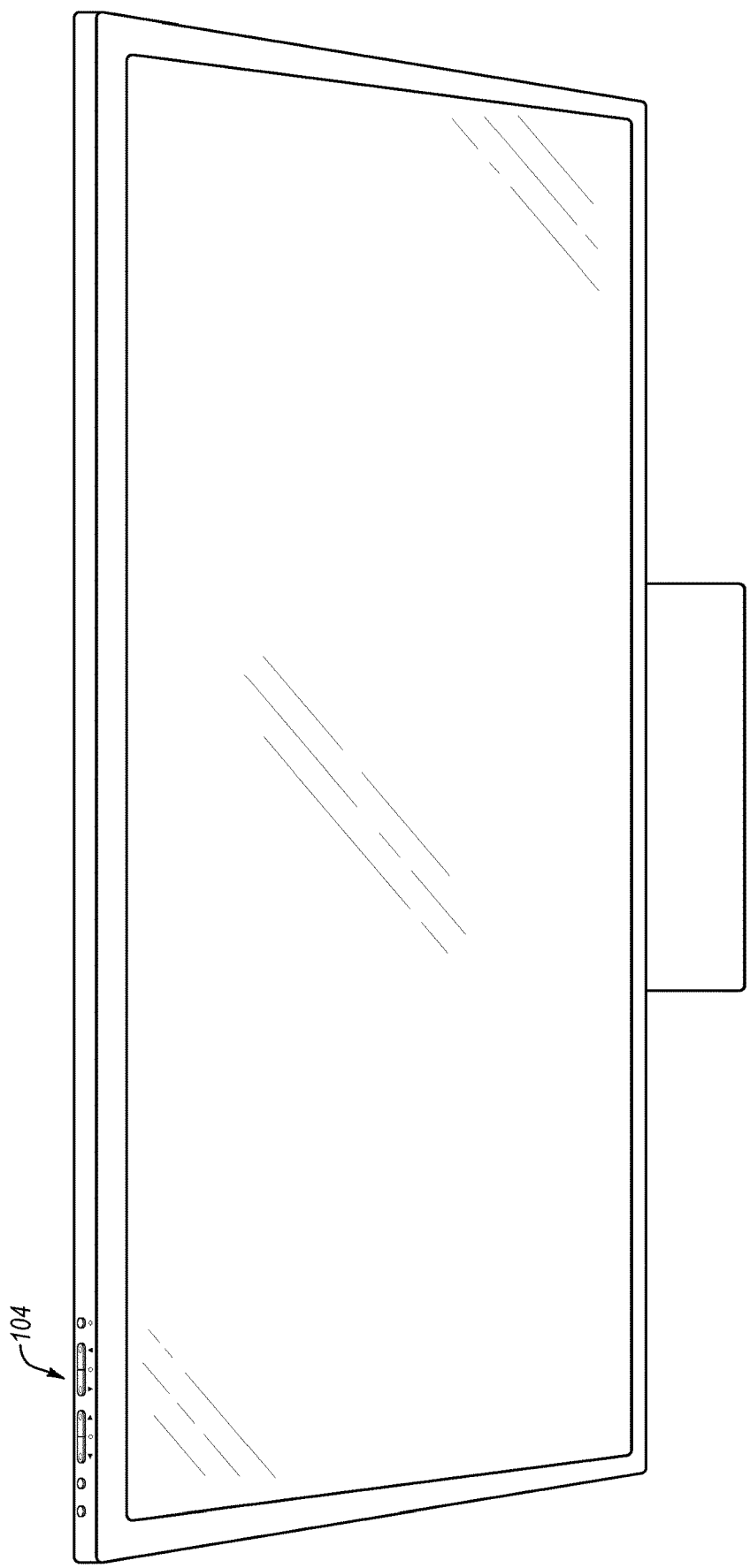

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, arrangement, configuration, or any other property.

Specific implementations shown and described are only examples and should not be construed as the only way to implement the present disclosure unless specified otherwise herein. Elements, circuits, and functions may be shown in block diagram form to avoid obscuring the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to a person of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of a person of ordinary skill in the relevant art.

Thus, examples provided in the present disclosure are intended to help enable a person of ordinary skill in the art to practice the disclosure and the disclosed embodiments. The use of the terms "exemplary," "by example," "for example," and the like, means that the related description is explanatory and non-limiting, and while the scope of the disclosure is intended to encompass the examples of the present disclosure and their legal equivalents, the use of such terms is not intended to limit the scope of an embodiment or this disclosure to the specified components, steps, features, functions, or the like.

A person of ordinary skill in the art would understand that information and signals may be represented using any of a variety of different technologies and techniques. For example, data, instructions, commands, information, signals, bits, symbols, and chips that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general purpose processor, a special purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein.

A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

Embodiments of the disclosure may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, etc. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

As used herein, the term "substantially" in reference to a given parameter, property, or condition means and includes to a degree that a person of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

The various embodiments described in this disclosure relate, generally, to a touch user interface (UI) that interacts with, and may be used to manipulate, a graphical user interface (GUI) of a display utility presented at a graphical overlay (also referred to as a "graphical video overlay" if primarily presented over a video input). Embodiments of the disclosure may be incorporated into display systems, including bezel-less display systems. Some embodiments of bezel-less display systems may be characterized by dimensions that are limited only by the dimensions of a display, display electronics, touch interface electronics, and a thickness of housing walls.

As used herein, "display system" means an output device that provides information in visual form and/or audio form, and includes, by way of example, monitors and televisions. A display system may include a display, circuitry/electronics, power supply, and a housing. Examples of displays include, a liquid crystal display (LCD), thin-film-transistor LCDs (TFT-LCDs), light emitting diode (LED) displays, organic LED displays, plasma displays, and cathode-ray-tube (CRT) displays. A display system may also include interfaces to receive one or more of video and audio signals, for example, coaxial cable, video graphics array, digital visual interface (DVI), high-definition multimedia interface (HDMI), DisplayPort, Thunderbolt, low-voltage differential signaling (LVDS), and other formats and signals. The electronics may process or transform the various video and audio signals into other formats to facilitate display of visual information.

Unless otherwise stated, the use herein of "front," "in-front," "back" or "behind" in relation to a display system, "front" means the display side of the display system and "back" means the side of the display system opposing the display (typically defined by a wall of a housing), and "in-front" means the direction from the back surface to the display, and "behind" means the direction from the display to the back surface.

Various embodiments of the display systems described herein may include one or more contact interfaces, including touch user interfaces. As understood for purposes of the embodiments described herein, a contact sensor may respond to an object's (such as a finger or a stylus) contact with, or the object's proximity to, a contact-sensitive area of a contact interface. In this disclosure "contact" and "touch"

generally refer to an object's physical contact with a contact-sensitive area, but it may also encompass the close proximity of an object that produces a detectable response by a contact sensor. Further, a reference to an area or element as "contact-sensitive" or (e.g., a "contact-sensitive area" or "contact-sensitive button") refers to a physical area or element of a touch interface where a contact sensor may respond to an object's contact. In the case of a contact-sensitive area that is a surface, the contact-sensitive area may be referred to herein as a "contact-sensitive surface." Contact sensors may use various techniques to sense contact, including projective sensing techniques (e.g., self-capacitance, mutual capacitance, and combinations thereof), resistive sensing, infrared sensing, optical sensing, and combinations thereof. If a contact-sensitive area, contact sensor, or controller is, or is anticipated to be, incorporated into a touch interface, then it may also be characterized as a touch-sensitive area, touch sensor, or touch controller, as the case may be.

A contact-sensitive UI may be used (e.g., by a user) to manipulate a GUI. For example, a GUI typically includes one or more display regions and active/activatable regions. As used in this disclosure, a display region is a region of a GUI which displays information to a user. An activatable region is a region of a GUI, such as a button, slider, or a menu, which allows the user to take some action with respect to the GUI (e.g., if manipulated). Some display regions are also activatable regions in that they display information and enable some action that may be taken by a user. In a contact-sensitive GUI, contacting a contact-sensitive area associated with an activatable region may activate that region (e.g., selecting a GUI button). Activatable regions may be displayed as GUI elements/objects, for example, buttons, sliders, selectable panes, menus, etc., all of various shapes and sizes.

Generally, if contact is sensed at a contact-sensitive area, a process is used to determine the activatable regions of the GUI to which the contact corresponds, if any. For example, if an "ENTER" button is touched by a finger, the contact is detected and responsive to the detected contact a process determines that the contact was at the ENTER button. The ENTER button is an activatable region, so events are created in the touch-sensitive GUI and/or the underlying application that invoked the GUI.

Figure 2A:
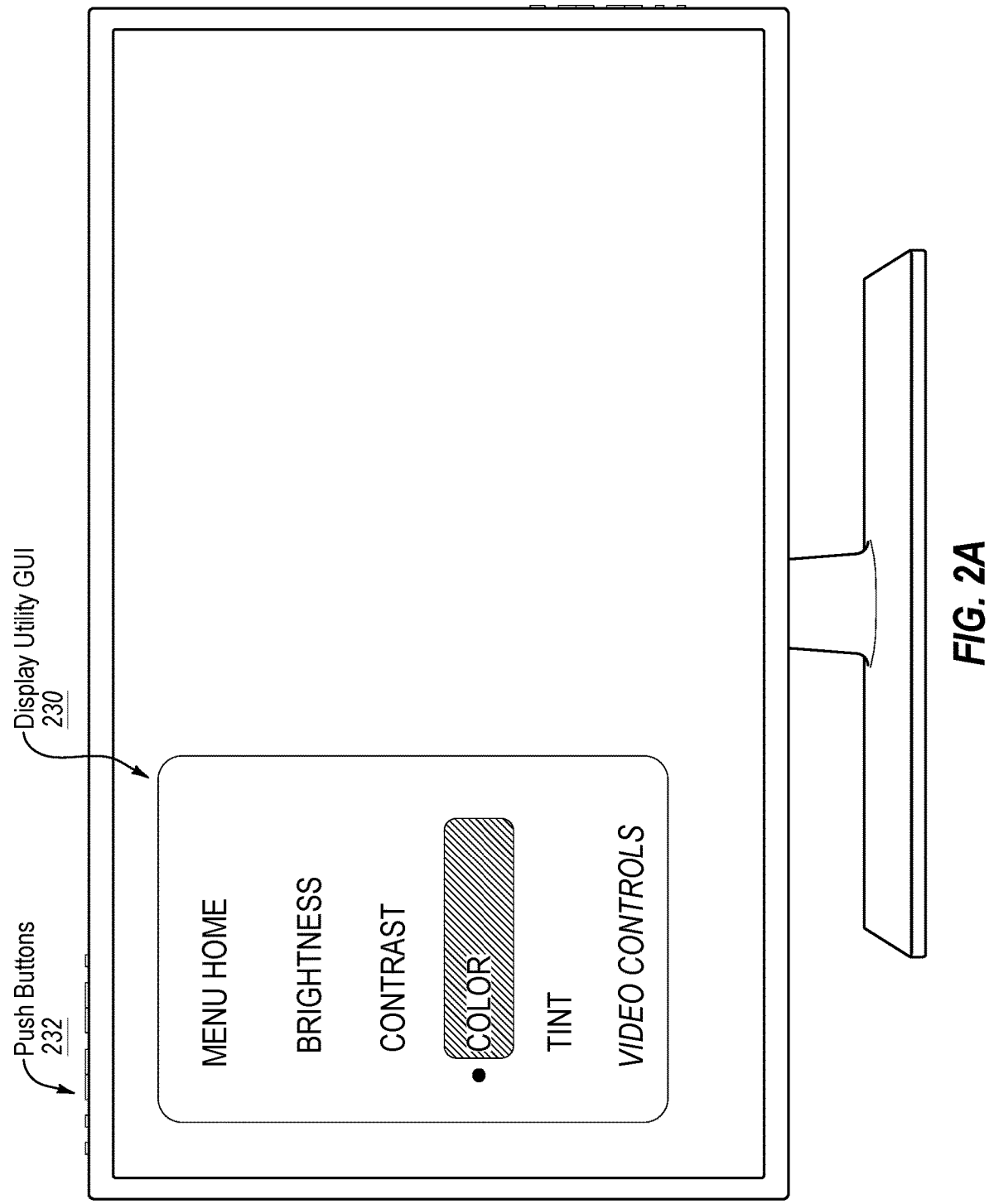
FIG. 2A shows a display utility graphical user interface (GUI) in accordance with the state of the art.
Figure 2B:
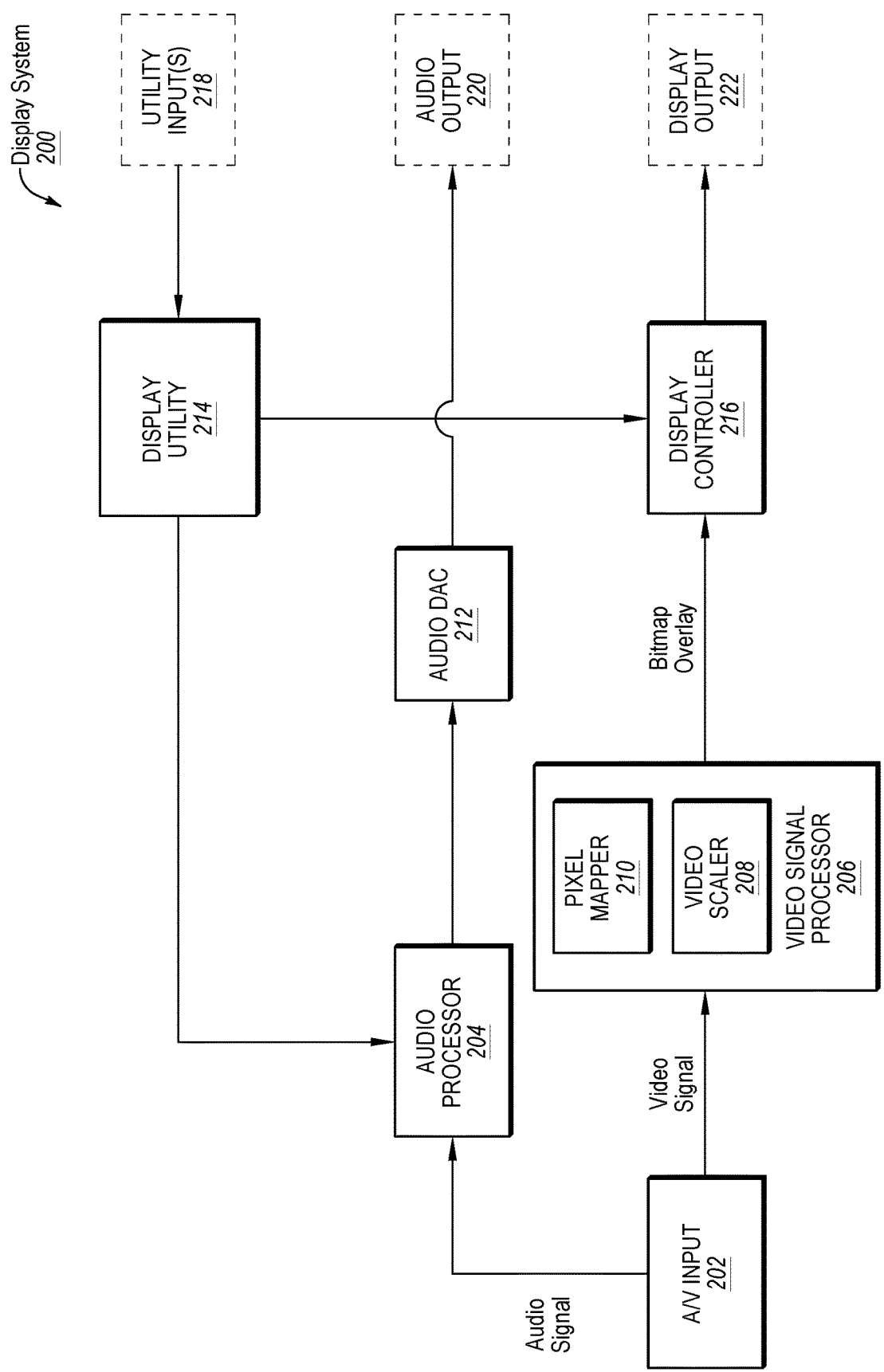
FIG. 2B shows a functional block diagram of a display system in accordance with the state of the art.

FIG. 2B shows a functional block diagram of a display system 200 that incorporates a display utility GUI, such as the display utility GUI 230 (see FIG. 2A), in accordance with the state of the art as understood by the inventors. The audio/video (A/V) input 202 provides a video signal to a video signal processor 206 that performs pixel mapping 210 and video scaling 208 on the video signal, and generate a bitmap. The display utility 214 may provide information about a display utility GUI 230 to the video signal processor 206, for presentation at the display output 222. A display controller 216 may control the display output 222 according to the output of the video signal processor 206, for example, a bitmap. A user may interact with the display utility GUI 230 by using push buttons 232 (see FIG. 2A) coupled to the utility input(s) 218. Audio signal, audio processor 204, audio DAC 212 and Audio output 220 are also depicted on FIG. 2B.

As noted, above, requiring the use of push buttons 232 constrains the ability of display system manufacturers to eliminate a bezel or even reduce the dimensions of a bezel, and therefore constrains their ability to reduce the dimensions, in terms of depth or thickness, of a display system. Stated another way, push buttons 232 put a limit on the dimensions of a bezel on devices such as televisions and monitors, and devices that incorporate display system such as tablet computers, mobile phones, and desktop computers.

Figure 3A:
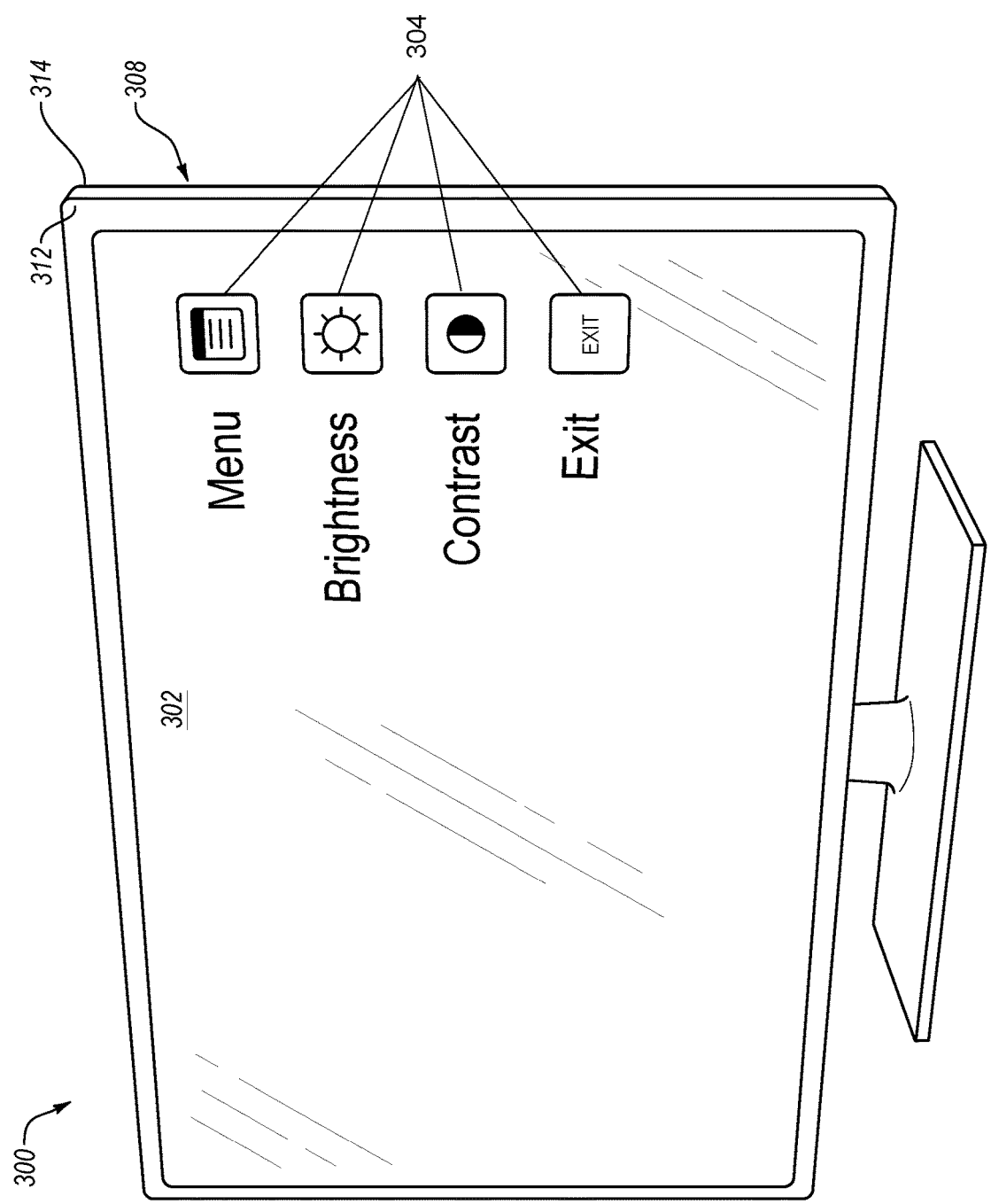
FIGS. 3A and 3B show a display system including a touch user interface and a GUI associated with a display utility, in accordance with embodiments of the disclosure.
Figure 3B:
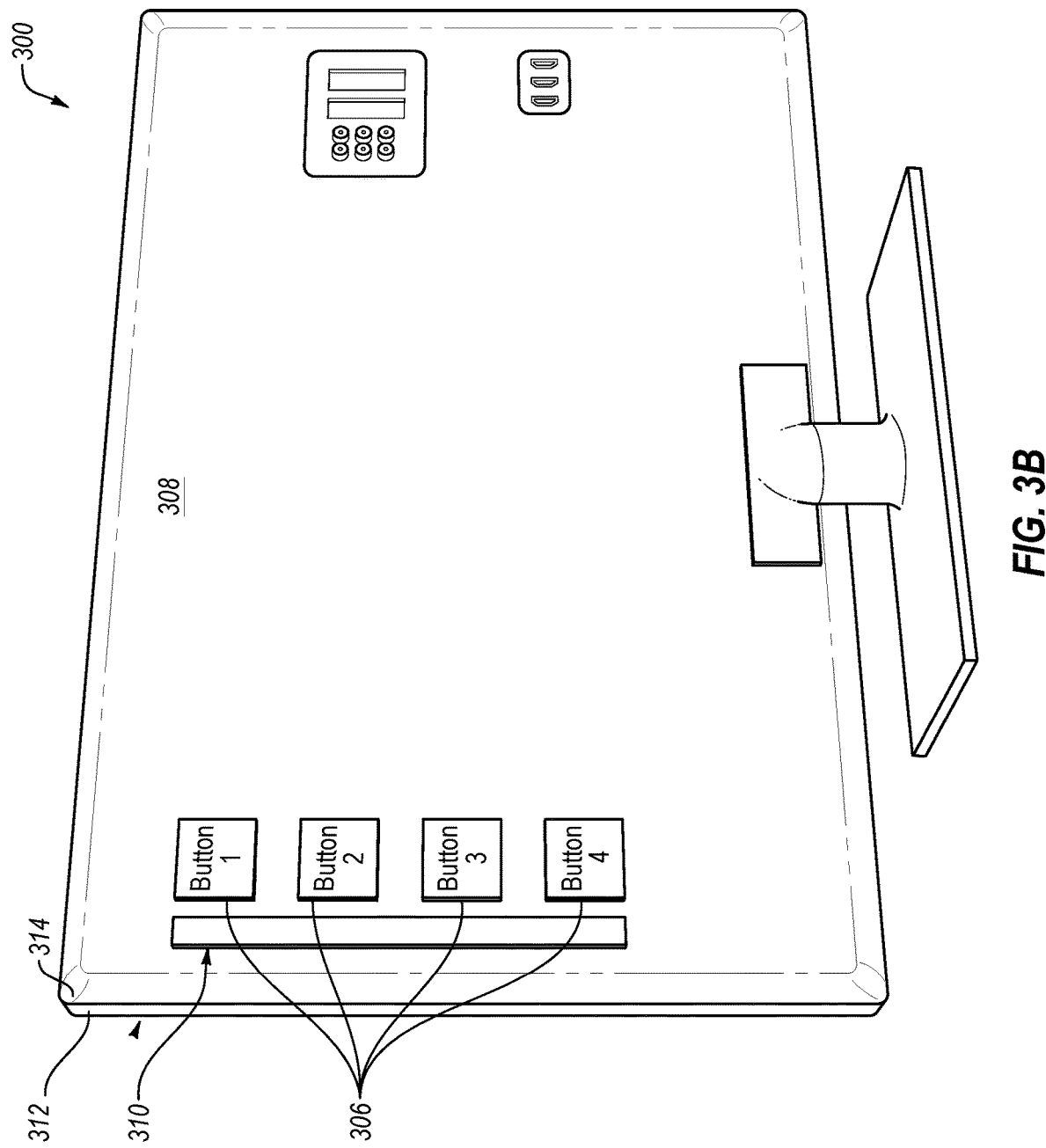

FIGS. 3A and 3B show a display system 300, in accordance with embodiments of the disclosure. While the display system 300 shown in FIG. 3A is a bezel-less LCD monitor, other display types and profiles are specifically contemplated. The display 302 of the display system 300 may present a graphical video overlay comprising visual buttons 304, which may also be characterized as "virtual" buttons, for monitor settings. The visual buttons 304 may be associated with a display utility that controls one or more characteristics of the display system 300. In one embodiment, the visual buttons may include "menu," "brightness," "contrast," and "exit." Other activatable GUI elements may be included, in addition to or alternatively to, the visual buttons 304. Further, other GUI elements associated with other display system settings may be presented by the display utility GUI. Finally, layouts other than a vertical list may be used, for example, a horizontal list, a dial or rotary arrangement, or combinations thereof. Such layouts may incorporate tree structures. In various embodiments, the type, form, and number of GUI elements may be defined in a GUI application executing in the display system 300.

FIG. 3A shows a front-of-the-monitor view of the display system 300, (including the display 302). FIG. 3B shows a back-of-the-monitor view of the display system 300. Together, FIGS. 3A and 3B show a relationship between contact-sensitive buttons 306 (e.g., capacitive touch ("cap-touch") buttons) and visual buttons 304 (see FIG. 3A). Shown on the back of monitor view are four contact-sensitive buttons 306 that may be contact-sensitive surfaces located on the back surface 308 of the display system 300. Also shown is a finger (or hand) proximity sensor 310 that may be a contact-sensitive surface located on the back surface 308 of the display system 300. Shown on the front-of-the-monitor view is a graphical overlay including the visual buttons 304 for monitor settings. The contact-sensitive buttons 306 and visual buttons 304 are located in substantially mirroring locations on back surface 308 and display 302, respectively. In other words, the location of the contact-sensitive buttons 306 relative to the top left corner 314 is substantially the location of the visual buttons 304 relative to the top right corner 312. In one embodiment, an ergonomic offset in the respective relative positions may exist to allow for a comfortable hand placement and finger placement relative to the contact-sensitive buttons 306.

In some embodiments, one or more of the number, dimensions and shape of the contact-sensitive buttons 306 and visual buttons 304 are not substantially congruent. For example, there may be more or fewer contact-sensitive buttons 306 than visual buttons 304; and the shape and dimensions of one or more visual buttons 304 may be different than the shape and dimensions of one or more of the contact-sensitive buttons 306.

Figure 3C:
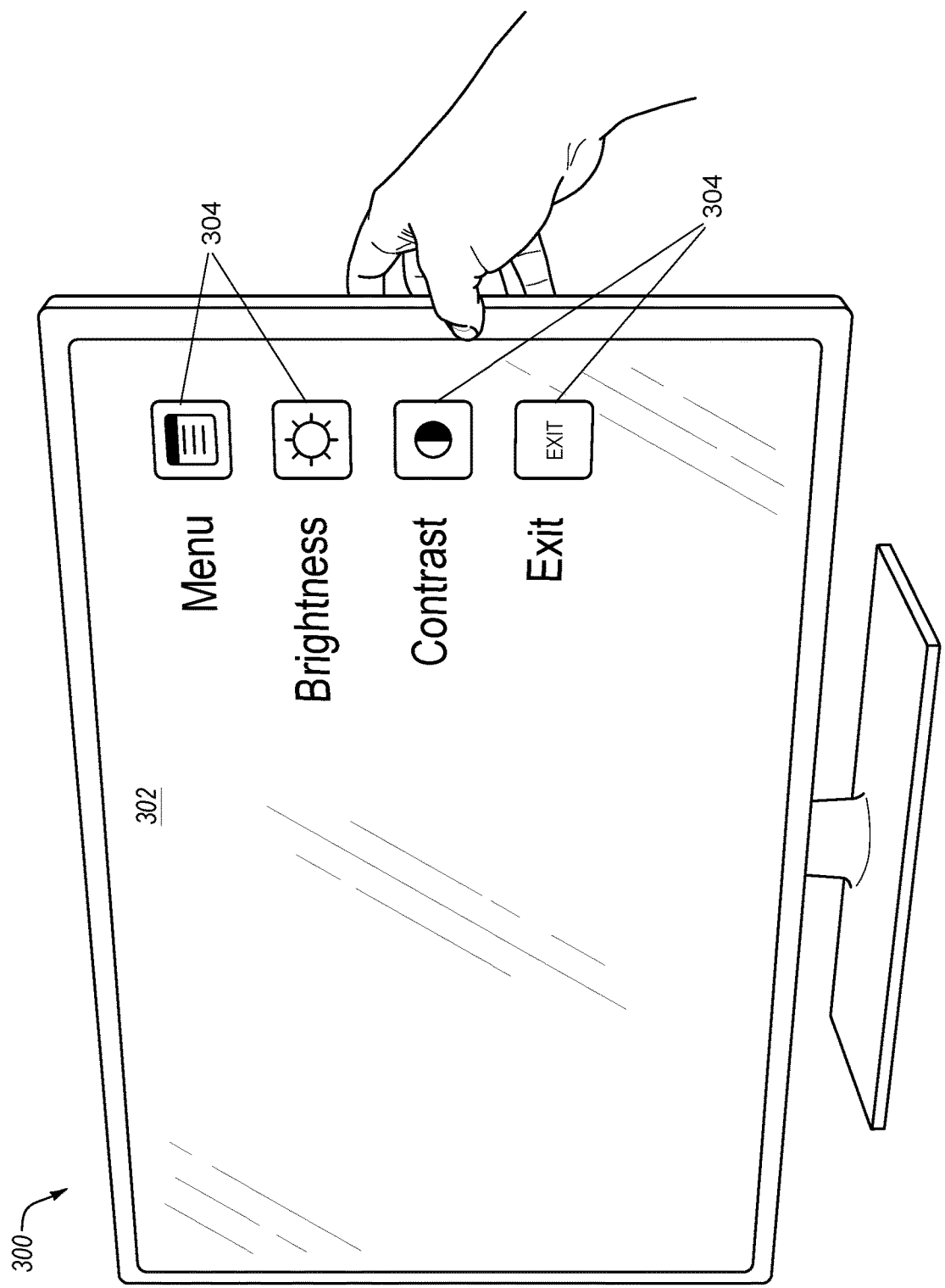
FIG. 3C shows an example of a user interacting with a display system of FIGS. 3A and 3B, in accordance with embodiments of the disclosure.

FIG. 3C shows a display system 300 in use: a user's fingers and hand reach around the right side of the display system 300 so that the fingers are able to manipulate one or more of the contact-sensitive buttons 306 that are associated with the visual buttons 304.

Turning back to FIG. 3B, also shown is an embodiment of a finger proximity sensor 310. The finger proximity sensor 310 may be a contact-sensitive surface that extends the vertical length of a region having the cap-touch buttons 306. A hand or other object that contacts the finger proximity sensor 310 (for example, as a user reaches toward the contact-sensitive buttons 306) may activate a display utility GUI including the visual buttons 304, which may be presented at a graphical overlay.

Although the contact-sensitive buttons 306 are shown in FIGS. 3A and 3B as separate contact-sensitive surfaces at specific locations on the back surface 308, the disclosure is not so limited. For example, in one embodiment, there may be a single touch-sensitive surface, and responsive to detecting finger, a hand and/or an initial touch on the single touch-sensitive surface the utility touch GUI 348 (see FIG. 4) may be configured to associate various locations on the single touch-sensitive surface with visual buttons 304. In one embodiment, the utility touch GUI 348 may associate various locations on the single touch-sensitive surface responsive to reported position information, e.g., from a touch sensing sub-system. Embodiments of a single touch-sensitive surface may be configured so that a user may manipulate a GUI with their finger by tapping, sliding, rotating, and combinations thereof.

In one embodiment, the back surface 308 may include physical topographical features, for example, grooves, texturing, ridges, or combinations thereof. In one embodiment, the physical features may be associated with a touch-sensitive region having cap-touch buttons, generally, and in another embodiment the physical features may define individual cap-touch buttons. In such embodiments, the physical features may provide tactile feedback to a user of a display system 300.

Figure 4:
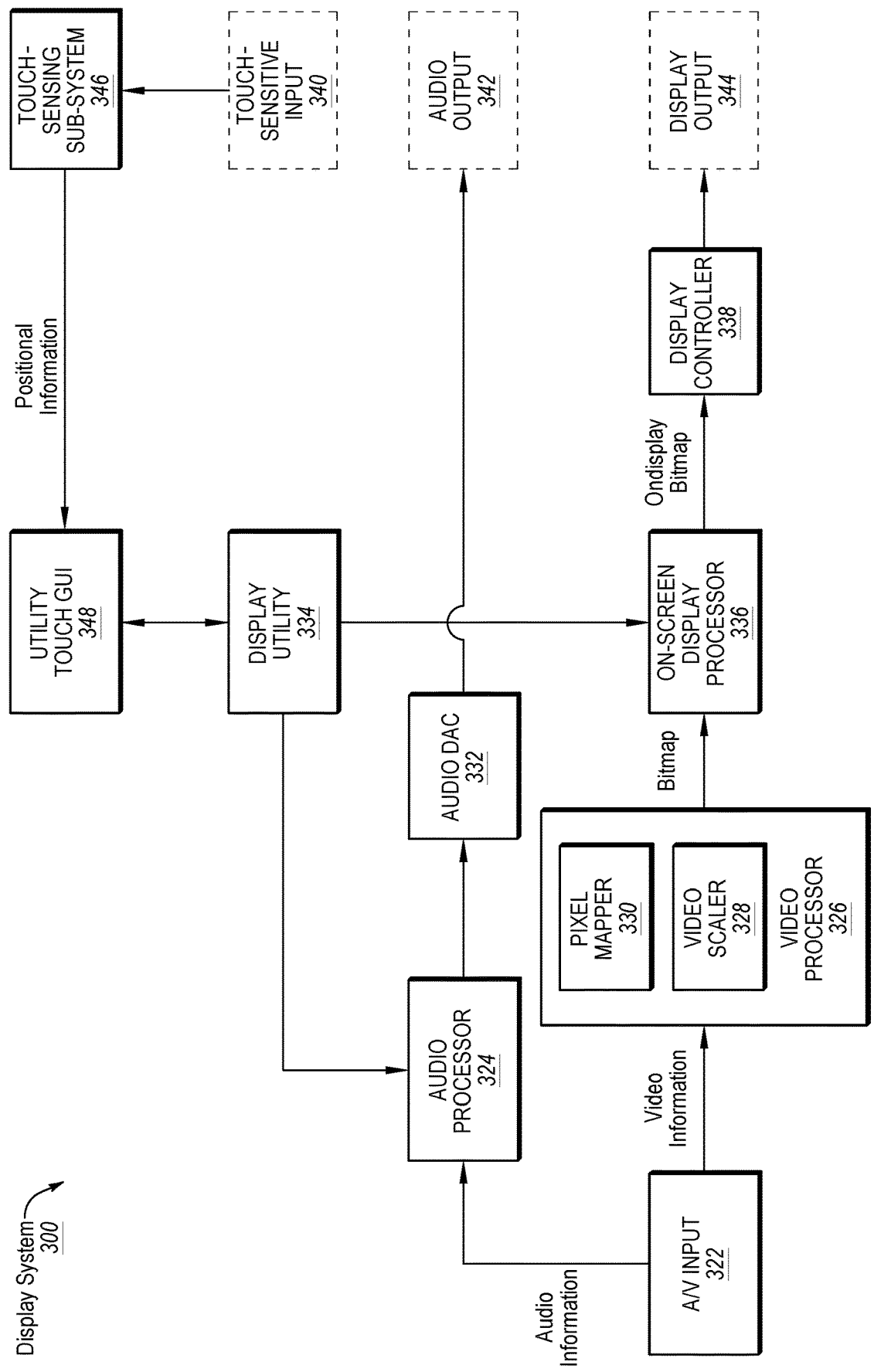
FIG. 4 shows a functional block diagram of a display system, in accordance with embodiments of the disclosure.

FIG. 4 shows a functional block diagram of a display system 300, in accordance with embodiments of the disclosure. A display system 300 may receive a media signal comprising media information at an audio-visual (A/V) input 322. A media signal may include, but is not limited to, audio information and/or video information. The A/V input 322 may include any interface known to a person of ordinary skill in the art for receiving media information, including analog interfaces, digital interfaces, and combinations thereof, including without limitation coaxial cable, video graphics array (VGA and SVGA), digital visual interface (DVI), high-definition multimedia interface (HDMI), DisplayPort, Thunderbolt, low-voltage differential signaling (LVDS), and other formats and signals In one embodiment, the display system 300 includes both display output 344 and audio output 342, and video information is received at a video processor 326, and the audio information is received an audio processor 324. The audio processor 324 may be operatively coupled to audio digital-to-analog converter (DAC) 332, which is configured to convert processed analog audio signals to digital signals that can be output by audio output 342 (e.g., a speaker). In other embodiments there may not be an audio output or audio DAC 332, and the media information may not include audio information. Alternatively, if audio information is included, it may not be processed (e.g., ignored).

The video processor 326 may be configured to process the video information and generate video information in a format usable by the display controller 338 to control the display output 344. The video processor 326 may include a pixel mapper 330 and a video scaler 328. The pixel mapper 330 may be configured to map video information to specific display pixels using techniques known to persons of ordinary skill in the art. In one embodiment pixel mapping may be 1:1 pixel mapping, however, the disclosure is not limited to 1:1 pixel mapping. The video scaler 328 may be configured to scale the pixel mapped video information to a set resolution. In one embodiment, the resolution may be a native resolution of the display output 344. The video processor 326 may provide the processed information as a bitmap (or a pixmap, or file format that incorporates bitmaps, for example, device independent bitmap, interleaved bitmap, portable bitmap, and compressed forms thereof) to an on-screen display processor 336.

In some embodiments, the video information may comprise a default image (e.g., a blue screen), and that default image may indicate that no video signal has been provided or is being processed. The default image may be presented responsive to a "no-input signal" that is stored at the display system 300.

The on-screen display processor 336 may be configured to process the bitmap with visual information associated with a graphical overlay. In one embodiment, the on-screen display processor 336 may read a bitmap from a frame buffer (not shown). In another embodiment, the on-screen display processor 336 may receive a bitmap before providing it to a frame buffer. In yet another embodiment, the on-screen display processor 336 may be incorporated with the video processor 326.

The on-screen display processor 336 may be configured to process a bitmap to include visual information for display of a graphical overlay, for example, a display utility overlay shown in FIGS. 3A and 3B. Processing the bitmap may include overwriting information on the bitmap with visual information related to an overlay. The overwritten information may be associated with pixels corresponding to one or more locations on the display output 344 at which a graphic video overlay, including a utility GUI, may be displayed. In cases where there is no visual information for display at a graphical video overlay, the on-screen display processor 336 may pass through a bitmap without processing it. The on-screen display processor 336 may be configured to provide an overlaid-bitmap. The display controller 338 may be configured to control the display output 344 responsive to the overlaid bitmap(s).

The on-screen display processor 336 may be configured to receive overlay visual information from a display utility 334. The display utility 334 may be configured to provide overlay visual to the on-screen display processor 336, as well as operably control display characteristics of the display system 300 responsive to one or more events received from a utility touch GUI 348. Providing overlay visual information for an on-screen display utility to the on-screen display processor 336 may include, for example, providing visual information associated with display of a display utility GUI. The visual information may include the elements of a GUI associated with the on-screen display utility, visual indicators indicative of manipulation (e.g., by a user) of a GUI, and visual indicators of settings associated with characteristics of the display system 300.

The display utility 334 may be configured to receive information about user manipulation of elements of a display utility GUI from a utility touch GUI 348. The utility touch GUI 348 may be configured to generate events responsive to position information associated with contact sensed by a touch sensing sub-system 346. In one embodiment, the utility touch GUI 348 may resolve position information to GUI elements and activate one or more GUI elements responsive to the resolved position information. An event-driven GUI associated with an on-screen display utility overlay may operate, generally, as would be understood by a person of ordinary skill in the art.

The touch sensing sub-system 346 may be configured to detect, and determine position information associated with contact at a touch-sensitive input 340. In various embodiments, the touch-sensitive input 340 may include contact-sensitive surfaces such as the contact-sensitive buttons 306 (see e.g., FIG. 3B). By way of example, the touch sensing sub-system 346 may use a form of projected capacitance sensing that includes sensing by self-capacitance, mutual capacitance, or combinations thereof.

In one embodiment, one or more of the touch-sensing sub-system 346, utility touch GUI 348, and display utility 334, may be implemented on a microcontroller. The microcontroller may have sufficient processing cores and memory to execute one or more of the functions of the touch sensing sub-system 346, utility touch GUI 348, and display utility 334. In one embodiment, the microcontroller is a display controller having a memory and a microprocessor, and configured to control a display. In such an embodiment one or more of the utility touch GUI 348 and display utility 334 may be installed at a program store of the display controller.

In some embodiments, one or more of touch-sensing sub-system 346, utility touch GUI 348, and display utility 334 may implemented as an embedded unit, such as a peripheral, on the microcontroller. In one embodiment, an embedded unit may be configured to perform one or more core operations without interrupting a microprocessor of the microcontroller. In one embodiment, an embedded unit may include a digital logic circuit or a configurable state-machine that is configured to control at least some of the operations of the embedded unit. A person of ordinary skill in the art will understand many advantages to such an architecture, examples include economies of space within a display system having fewer electronic components, fewer interconnects, and highly integrated contact sensing and GUI functions for improved interoperability.

Figure 5:
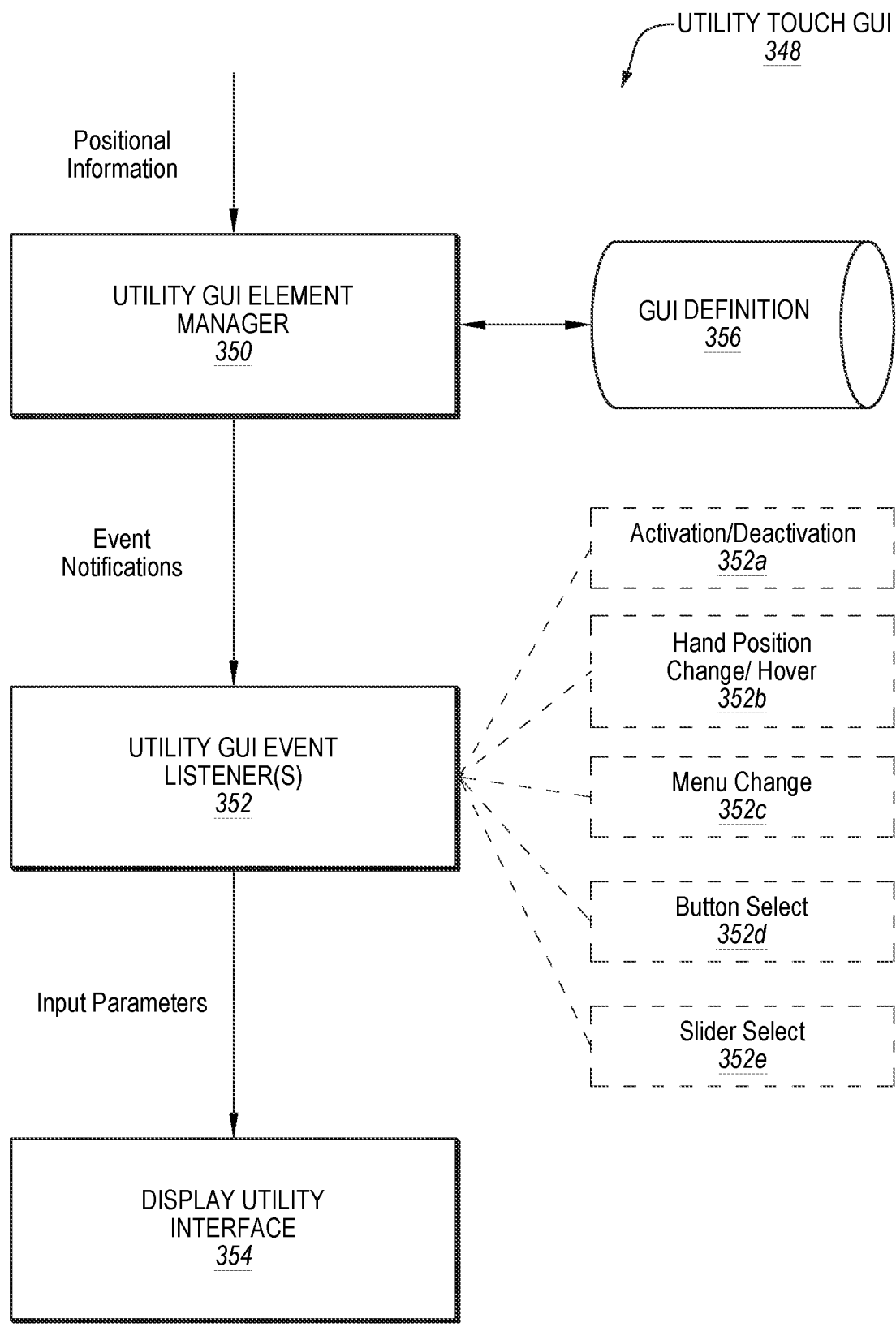
FIG. 5 shows a functional block diagram of a utility touch GUI, in accordance with embodiments of the disclosure.

FIG. 5 shows an embodiment of a utility touch GUI 348 that includes a utility GUI element manager 350, utility GUI event listeners 352, and a display utility interface 354. The utility GUI element manager 350 may be configured to determine specific elements of a utility GUI based on position information and a GUI definition 356. Based on the determined elements of the GUI, the utility GUI element manager 350 may generate and provide (e.g., publish) one or more events associated with the determined elements. The utility GUI event listeners 352a-352e (collectively referred as event listeners 352) may be configured to execute responsive to the received events. The utility GUI event listeners 352 may be attached to one or more GUI elements using techniques known to a person having ordinary skill in the art.

FIG. 5 shows an embodiment of utility GUI event listeners 352, including listeners for activation/deactivation 352a, hand position change 352b, menu change 352c, button select 352d, and slider select 352e. A person of ordinary skill in the art will recognize that additions and subtractions to the event listeners 352 shown in FIG. 5 may be made, and are specifically contemplated by this disclosure.

Figure 6A:
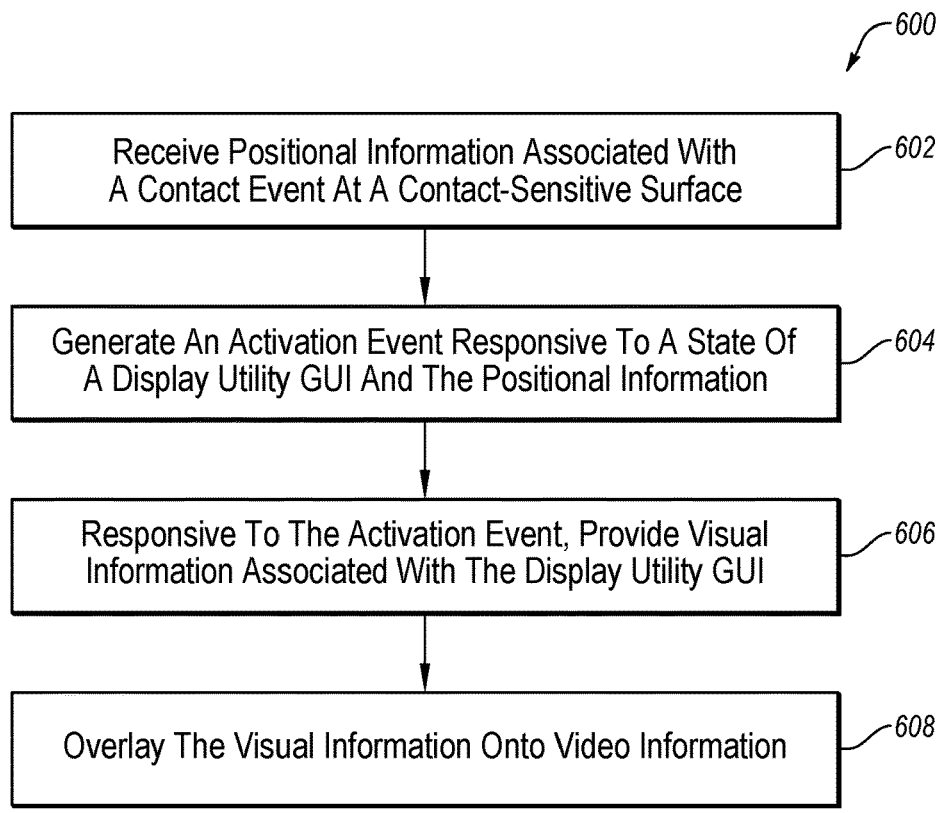
FIG. 6A shows a flowchart for activating a utility GUI for presentation by a graphical overlay, in accordance with embodiments of the disclosure.

FIG. 6A shows a flowchart for activating a display utility GUI for presentation at a graphical overlay, in accordance with embodiments of the disclosure. At operation 602, position information may be received associated with a contact event at a contact-sensitive surface. At operation 604, an activation event may be generated responsive to a state of a display utility GUI and the position information. In one embodiment, the state of the display utility GUI may be "not displayed" or "inactive." In one embodiment, the position information may be associated with one or more contact-sensitive surfaces associated with proximity detection, for example, the finger proximity sensor 310. At operation 606, visual information associated with the display utility GUI may be provided responsive to the activation event. In one embodiment, the visual information may be generated and/or provided by an activation/deactivation event listener 352a. The visual information may define elements and a layout of the display utility GUI. Further, state information for the display utility GUI may be changed to reflect that the GUI is "displayed" or "active," and an "active" mode may be enabled. At operation 608, the visual information may be overlaid onto video information. The video information with the visual information overlaid onto it may be presented at a display.

In some embodiments, the visual information is overlaid onto the video information according to predefined display location information. In other words, the display utility GUI is always displayed substantially at the same predefined location and so the process for overlaying the visual information onto the video information may include the predefined display location. In other embodiments, the display utility GUI may be displayed at different locations. For example, in one embodiment, the display location information may be determined and/or adjusted to align the display of the display utility GUI with contact events that are associated with a position of a user's hand/fingers.

Figure 6B:
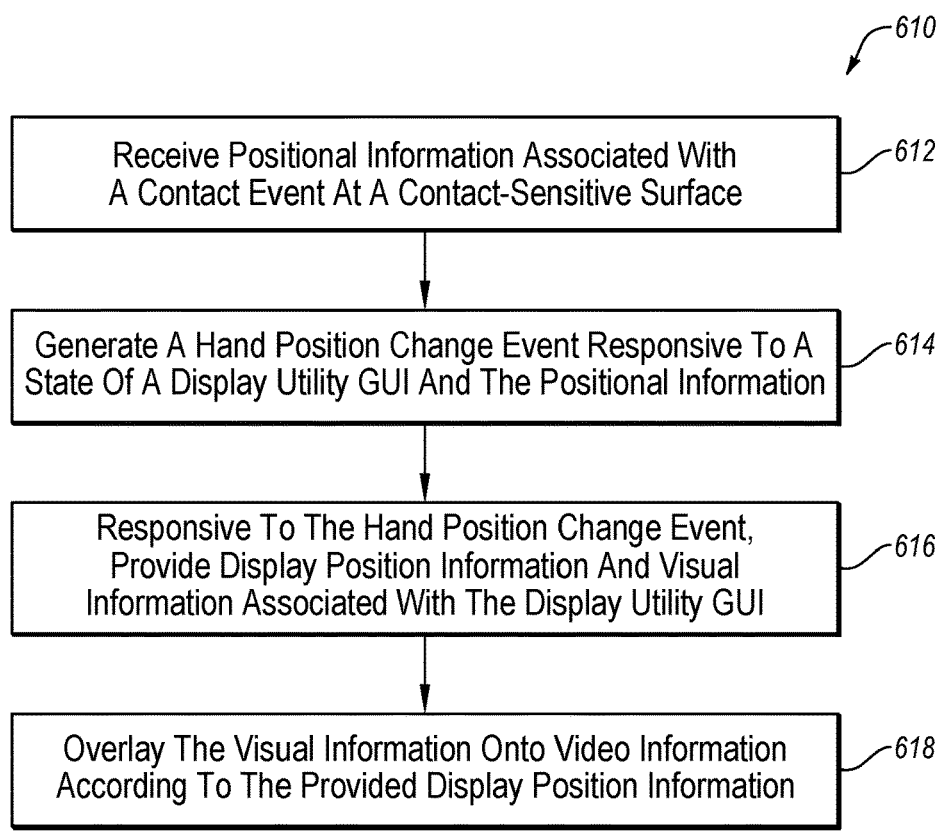
FIG. 6B shows a flowchart of operations associated with presenting a display utility GUI at a graphical overlay, in accordance with embodiments of the disclosure.

FIG. 6B shows a flowchart of operations associated with presenting a display utility GUI at a graphical overlay, in accordance with embodiments of the disclosure. At operation 612, position information may be received that is associated with a "contact" event at a contact-sensitive surface (or "hover" event because, as described in this disclosure, contact includes both physical contact with, and proximity to, a contact-sensitive area). At operation 614, a hand position change event may be generated responsive to a state of a display utility GUI and the position information. In one embodiment, the state of the display utility GUI may be "displayed" or "active." At operation 616, display position information and visual information associated with the display utility GUI may be provided responsive to the hand position change event. In one embodiment, the display position information and visual information may be generated and/or provided by a hand position change 352b event listener. The display position information may include information for the location of the display utility GUI elements such that, while displayed, the display utility GUI elements are aligned with one or more contact-sensitive surfaces.

In one embodiment, a hover event may be generated responsive to a detected presence of a hand or fingers. The utility GUI may be presented at the display responsive to the hover event. In one embodiment, an image representative of a user's fingers may be presented at the display responsive to the fingers and/or hand hovering over a contact-sensitive area. The image may show the user's fingers and/or hand relative to a utility GUI including visual buttons. In one embodiment, the user's fingers may be presented at a graphical overlay, for example, the same graphical overlay that presents the utility GUI or another graphical overlay. In one embodiment, visual information representative of a user's hand may be encoded in the video information and presented at the display output. As a user's fingers and/or hands move the overlaid image of the hand and/or finger may change. Further, as the hand and/or fingers move parallel to the display, the image may show a hand and/or fingers closer to, or farther away from, the elements of the utility GUI, including visual buttons.

Figure 6C:
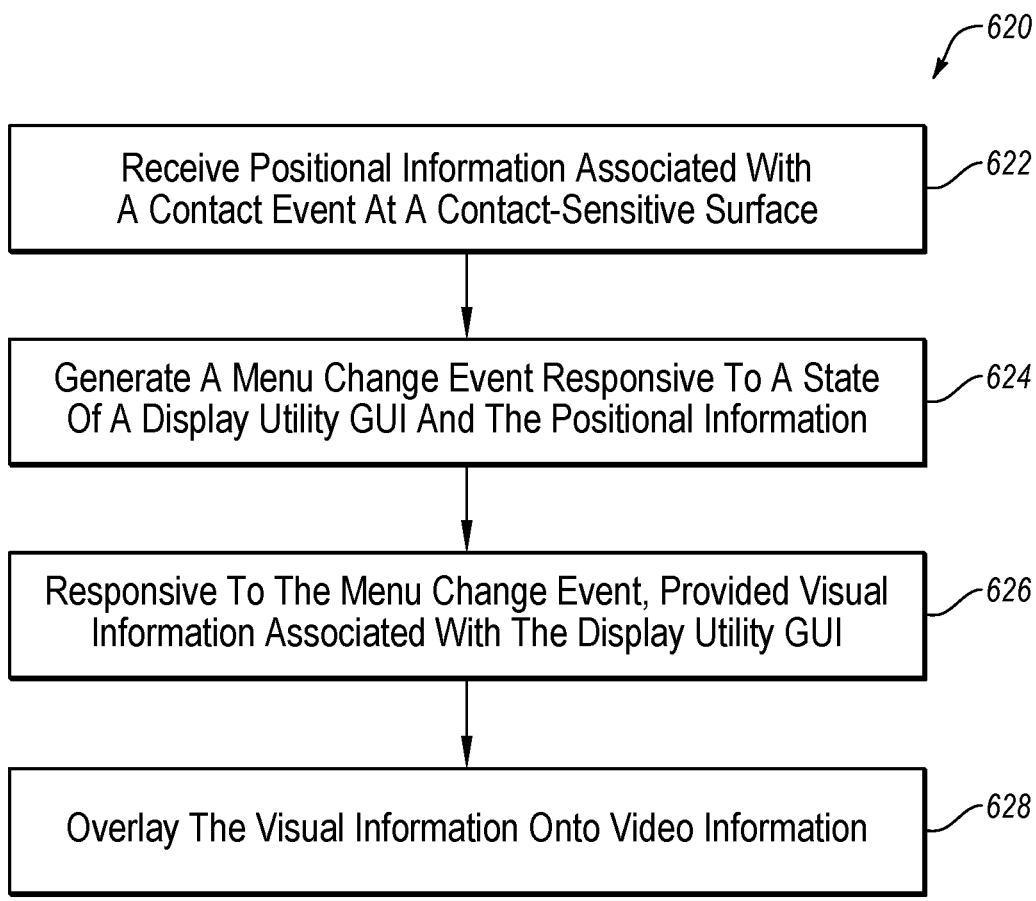
FIG. 6C shows a flowchart of a process associated with displaying a display utility GUI by a graphical overlay, in accordance with embodiments of the disclosure.

FIG. 6C shows a flowchart of a process 620 associated with displaying a display utility GUI by a graphical overlay, in accordance with embodiments of the disclosure. At operation 622, position information associated with a contact event at a contact-sensitive surface may be received. At operation 624, a menu change event may be generated responsive to a state of a display utility GUI and the position information. In one embodiment, the menu change event may be generated responsive to a determined manipulation of a GUI element associated with changing the layout and/or composition of a displayed GUI menu. At operation 626, visual information associated with the display utility GUI may be provided responsive to the menu change event. The visual information may include information about GUI elements and layout, including GUI elements and layout different than currently presented at a display. In one embodiment, the visual information may be generated and provided by a menu change 352*c* event listener. At operation 628, the visual information may be overlaid onto video information.

Figure 6D:
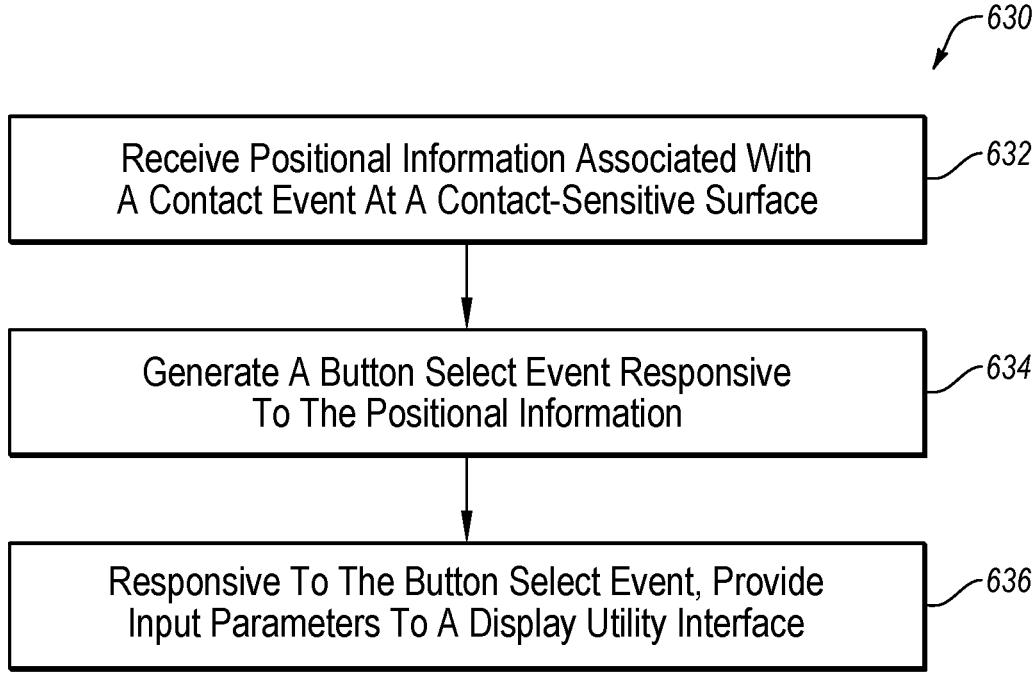
FIG. 6D shows a flowchart of a process associated with processing manipulation of a display utility GUI presented at a graphical overlay, in accordance with embodiments of the disclosure.

FIG. 6D shows a flowchart of a process 630 associated with processing manipulation of a display utility GUI presented at a graphical overlay, in accordance with embodiments of the disclosure. At operation 632, position information associated with a contact event at a contact-sensitive surface is received. At operation 634, a button select event is generated responsive to the position information. At operation 636, input parameters may be provided responsive to the button select event. In one embodiment, the input parameters may be generated and provided by a button select 352*d* event listener. Input parameters may be associated with characteristics of a display system (e.g., volume, resolution, brightness, tint, color, language selection, video modes, screen adjustment, input selection, etc.). The input parameters may be provided to a display utility, which may control (e.g., change a control variable) one or more settings associated with characteristics of a display system responsive to the input parameters. Controlling such settings may result in visual and/or audio changes to a display of the display system. In one embodiment, the input parameters may be provided to a display utility by way of a display utility interface.

Figure 6E:
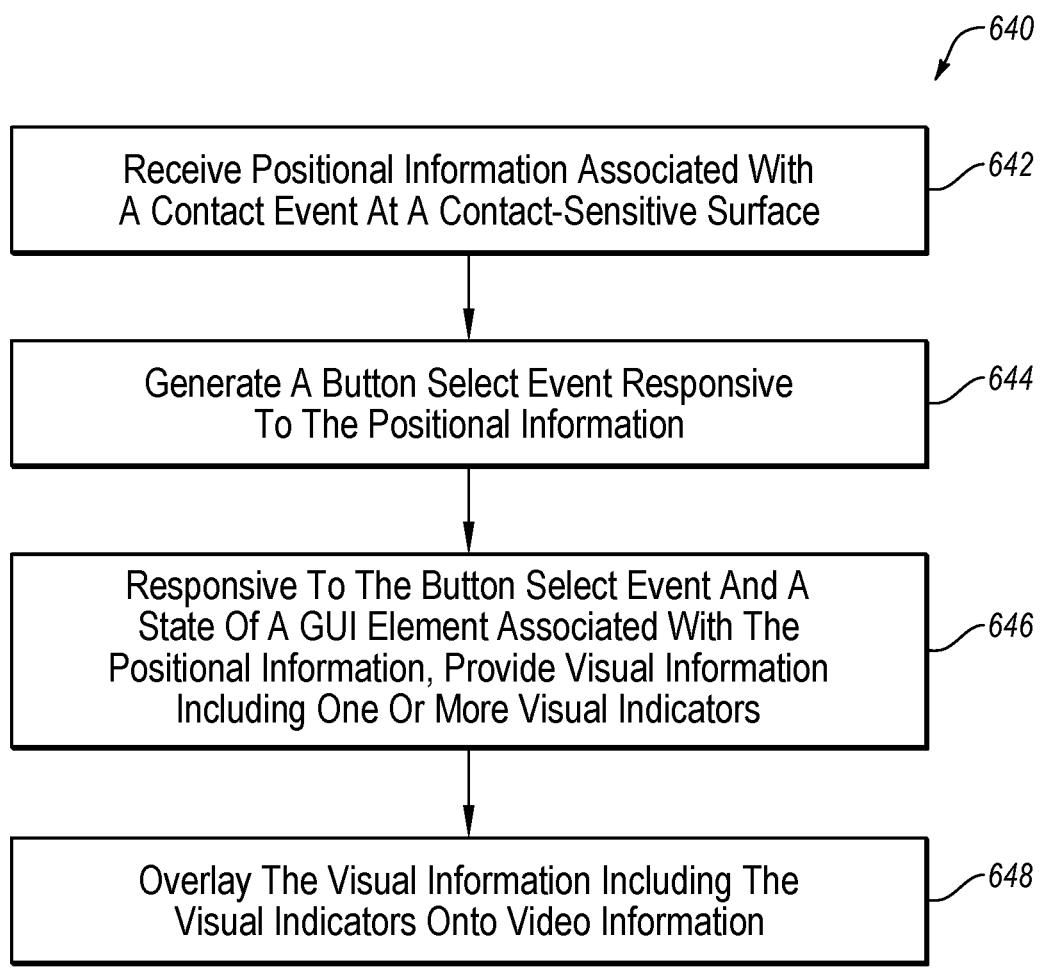
FIG. 6E shows a flowchart of a process associated with processing manipulation of a display utility GUI presented at a graphical overlay, in accordance with embodiments of the disclosure.

In some embodiments, visual indicators may be provided responsive to a button-select event prior to input parameters. FIG. 6E shows a flowchart of a process 640 associated with processing manipulation of a display utility GUI presented at a graphical overlay, in accordance with embodiments of the disclosure. At operation 642, position information associated with a contact event at a contact-sensitive surface is received. At operation 644, a button select event is generated responsive to the position information. At operation 646, visual information comprising visual indicators (e.g., fade-in, highlight, outline solid, etc.) may be provided responsive to the position information and a state of the GUI element associated with the button select. The state of the GUI element may be a "finger hover" that is indicative of a finger over a cap-touch button or having tapped the cap-touch button once. At operation 648, the visual information comprising the visual indicators may be overlaid onto video information. While the visual information comprising the visual indicators are presented at a display, one or more elements of the display utility GUI may be displayed with the visual indicators.

Figure 7A:
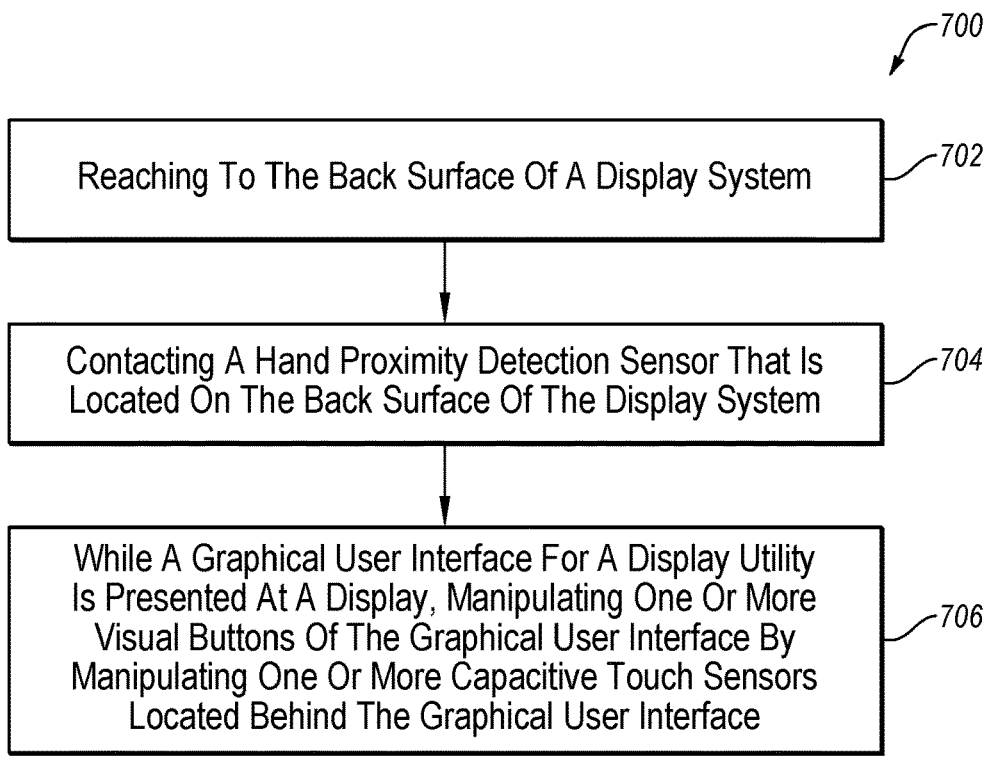
FIG. 7A shows a flowchart of a process for using a display system, in accordance with embodiments of the disclosure.

FIG. 7A shows a flowchart of a process 700 associated with using a display system 300, in accordance with embodiments of the disclosure. At step 702, a user may reach to a back surface of a display system. In various embodiments, a user may reach around the side or over the top of the display system to the back surface. At step 704, the user may contact a hand proximity sensor located at the back surface of display system. The hand proximity sensor may be located near the edge of the display and use capacitive touch sensors. Capacitive touch buttons may be located such that a user reaching around the side or over the top of the display system reaches over or past the hand proximity sensor. At step 706, while a graphical user interface for a display utility is presented at a display, manipulating one or more visual buttons of the graphical user interface by manipulating one or more capacitive touch buttons located behind the graphical user interface. Visual indicators may be presented at the display that are indicative of the user's manipulation of the visual buttons and aid a user to see what they are manipulating without seeing their fingers.

Figure 7B:
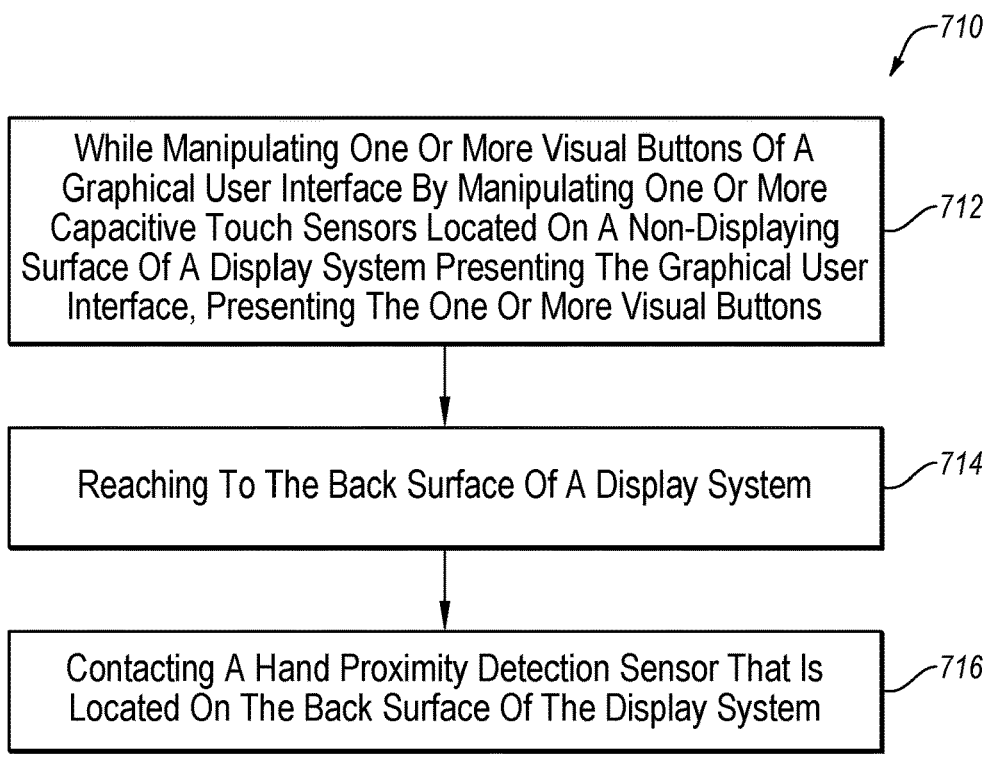
FIG. 7B shows a flowchart for controlling a display during use, in accordance with embodiments of the disclosure.

FIG. 7B shows a flowchart of a process 710 associated with using a display system 300, in accordance with embodiments of the disclosure. The process 710 may be performed while manipulating one or more visual buttons of a graphical user interface by manipulating one or more capacitive touch buttons located on a non-displaying surface of a display system presenting the graphical user interface. At operation 712, one or more visual buttons may be presented at a display. At operation 714, selection of one or more visual buttons may be visually indicated by a visual indicator presented at the display. At operation 716, an indication of changes to one or more settings of a display system may be presented at the display. The change to the one or more settings may be near in time to a change in a display characteristics, for example, brightness, resolution, tint, color, volume (if there is an audio output), etc.

As already noted, embodiments of the disclosure eliminate constraints on manufacturers' ability to reduce the width or depth profile of a display system. Embodiments of the disclosure have many other advantages that will be apparent to a person having ordinary skill in the art. For example, separating the contact-sensitive surface and the display reduces the noise that may otherwise be induced by the display (e.g., by the display data lines) at the contact sensor, which sometimes causes "false touches" at touch displays.

While certain embodiments have been described with reference to display settings, it is also specifically contemplated that the user interface described herein may be used to select and launch native applications on a display system. The menu to select and launch such native applications, as well as the graphical interface for the native applications, may be presented at a display by a graphical overlay.

In one embodiment, an appliance, such as a refrigerator, oven, microwave, washing machine, or dryer may have capacitive buttons and the capacitive buttons may be operatively coupled to a display system configured to display parameters related to the operation of the appliance (e.g., a cook or wash time, etc.) and display a utility GUI overlay for a utility application. By manipulating the capacitive buttons, a user may be able to manipulate settings related to the operation of the appliance.

Many of the functional units described in this specification may be illustrated, described or labeled as modules, threads, or other segregations of programming code, in order to more particularly emphasize their implementation independence. Modules may be at least partially implemented in hardware, in one form or another. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented using software or firmware, stored on a physical storage device (e.g., a computer readable storage medium), in memory, or a combination thereof for execution by various types of processors.

An identified module of executable code may, for instance, comprise one or more physical or logical blocks of computer instructions, which may, for instance, be organized as a thread, object, procedure, or function. Nevertheless, the executable of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several storage or memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more physical devices, which are referred to herein as computer readable media.

In some embodiments, the software portions are stored in a non-transitory state such that the software portions, or representations thereof, persist in the same physical location for a period of time. Additionally, in some embodiments, the software portions are stored on one or more non-transitory storage devices, which include hardware elements capable of storing non-transitory states and/or signals representative of the software portions, even though other portions of the non-transitory storage devices may be capable of altering and/or transmitting the signals. Examples of non-transitory storage devices are Flash memory and random-access-memory (RAM). Another example of a non-transitory storage device includes a read-only memory (ROM) which can store signals and/or states representative of the software portions for a period of time. However, the ability to store the signals and/or states is not diminished by further functionality of transmitting signals that are the same as or representative of the stored signals and/or states. For example, a processor may access the ROM to obtain signals that are representative of the stored signals and/or states in order to execute the corresponding software instructions.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with legal equivalents thereof. In addition, features from one embodiment may be combined with features of another embodiment while still being encompassed within the scope of the invention.

Additional non-limiting embodiments of the disclosure include:

Embodiment 1: a display system, comprising: a contact-sensitive user interface located on a back surface of the display system; a display configured to present a graphical user interface (GUI), the GUI comprising activatable regions configured to be interacted with by the contact-sensitive user interface; and a display system controller configured to change settings associated with characteristics of the display system responsive to activated regions of the GUI.

Embodiment 2: the display system of Embodiment 1, wherein the contact-sensitive user interface comprises a contact-sensitive surface.

Embodiment 3: the display system of any of Embodiments 1 and 2, wherein the contact-sensitive surface is adapted to respond to at least one of physical contact of objects and proximity of objects.

Embodiment 4: the display system of any of Embodiments 1 to 3, wherein the display is configured to present one or more activatable regions at one or more first locations on the display substantially in front of one or more second locations on the contact-sensitive user interface.

Embodiment 5: the display system of any of Embodiments 1 to 4, wherein the one or more first locations and one or more second locations are substantially opposing each other.

Embodiment 6: the display system of any of Embodiments 1 to 5, wherein the back surface comprises physical topographical features substantially at the one or more second locations.

Embodiment 7: the display system of any of Embodiments 1 to 6, wherein the physical topographical features comprise ridging, texture, etching, depressed portions, raised portions, and combinations thereof.

Embodiment 8: the display system of any of Embodiments 1 to 7, wherein the display is configured to present the GUI overlaid onto a video received at a video input of the display system.

Embodiment 9: the display system of any of Embodiments 1 to 8, wherein the display is configured to present the GUI overlaid onto a default image indicative of no video received at a video input of the display system.

Embodiment 10: the display system of any of Embodiments 1 to 9, wherein the characteristics of the display system comprise one or more of brightness, tint, resolution, color, video mode, language, screen adjustment, and input selection.

Embodiment 11: the display system of any of Embodiments 1 to 10, further comprising an audio output, wherein at least one of the characteristics of the display system is a volume associated with the audio output.

Embodiment 12: the display system of any of Embodiments 1 to 11, further comprising: a video input configured to receive video information; and a video processor, wherein the video processor is configured to overlay visual information associated with the graphical user interface onto video information received at the video input.

Embodiment 13: the display system of any of Embodiments 1 to 12, further comprising GUI application instructions stored on a memory that, while executed by a processor, are adapted to enable the processor to generate and/or handle one or more events associated with the GUI.

Embodiment 14: the display system of any of Embodiments 1 to 13, wherein the one or more events are associated with the activatable regions.

Embodiment 15: the display system of any of Embodiments 1 to 14, wherein the one or more events comprise an activation event, a deactivation event, a hand position change event, a hover event, a menu change event, a button select event, a slider select event.

Embodiment 16: the display system of any of Embodiments 1 to 15, further comprising: a touch sensor; and a touch controller configured to detect sensed touch signals received from the touch sensor and provide position information to a GUI application responsive to the detected sensed touch signals.

Embodiment 17: the display system of any of Embodiments 1 to 16, wherein the touch controller comprises a processor and a memory having one or more instructions stored thereon that, when executed by the processor, are adapted to enable the processor to perform functions, tasks, or activities associated with the GUI application.

Embodiment 18: the display system of any of Embodiments 1 to 17, wherein the touch controller further comprises one or more embedded units configured to perform touch detection and touch processing responsive to the sensed touch signals.

Embodiment 19: the display system of any of Embodiments 1 to 18, wherein the touch controller comprises a microprocessor, and at least one of the one or more embedded units is configured to perform core operations without interrupting the microprocessor.

Embodiment 20: the display system of any of Embodiments 1 to 19, wherein the display is configured to present the graphical user interface responsive to an activation event.

Embodiment 21: the display system of any of Embodiments 1 to 20, wherein the activation event is a hand proximity event.

Embodiment 22: a system, comprising: a touch sensing sub-system configured to detect sensed touch signals received from one or more touch sensors and determine touch information responsive to the detected sensed touch signals; and a memory and a processor, the memory having one or more executable instructions stored thereon that, while executed by the processor, are adapted to enable the processor to: identify one or more GUI elements responsive to the touch information; and generate one or more events responsive to the identified one or more GUI elements.

Embodiment 23: the system of Embodiment 22, wherein the touch information is position information, and further wherein the one or more executable instructions are adapted to enable the processor to: compare the position information to stored position information that corresponds to one or more contact-sensitive buttons; and identify a contacted contact-sensitive button responsive to the comparison.

Embodiment 24: the system of Embodiments 22 and 23, wherein the position information is indicative of a first location on a contact-sensitive surface associated with one contact sensor of the one or more contact sensors, and the contacted contact-sensitive button is associated with the first location.

Embodiment 25: the system of any of Embodiments 22 to 24, wherein the one or more executable instructions are adapted to enable the processor to: compare a second position information to the stored position information that corresponds to the one or more contact-sensitive buttons; and identify a second contacted contact-sensitive button responsive to the comparison.

Embodiment 26: the system of any of Embodiments 22 to 26, wherein the second position information is indicative of a second location on the contact-sensitive surface associated with the one contact sensor of the one or more contact sensors, and the second contacted contact-sensitive button is associated with the second location.

Embodiment 27: the system of any of Embodiments 22 to 26, wherein the touch information is a touch sensor identifier, wherein the one or more executable instructions are adapted to enable the processor to: compare the touch sensor identifier to stored touch sensor identifiers that correspond to one or more contact-sensitive buttons; and identify a contacted contact-sensitive button responsive to the comparison.

Embodiment 28: a method, comprising: detecting sensed touch signals received from one or more touch sensors; determining touch information responsive to the detected sensed touch signals; identifying one or more graphical user interface (GUI) elements of a display utility overlay responsive to the touch information; and generating one or more events responsive to the identified one or more GUI elements.

Embodiment 29: a system, comprising: a touch sensing sub-system configured to detect sensed touch signals received from one or more touch sensors and determine touch information responsive to the detected sensed touch signals; and a memory and a processor, the memory having one or more executable instructions stored thereon that, while executed by the processor, are adapted to enable the processor to: identify an activation event responsive to the touch information; and activate a graphical user interface (GUI) overlay responsive to the touch information.

Embodiment 30: the system of Embodiment 29, wherein the one or more executable instructions are adapted to enable the processor to identify a contact-sensitive button responsive to the measured sensed touches.

Embodiment 31: the system of any of Embodiments 29 and 30, wherein the contact-sensitive button is a hand or finger proximity sensor.

Embodiment 32: the system of any of Embodiments 29 to 31, wherein the touch sensing sub-system is further configured to determine one or more locations at a contact-sensitive surface responsive to detected sensed touch signals, and the one or more executable instructions are adapted to enable the processor to: determine an offset between the one or more locations at the contact-sensitive surface and one or more corresponding locations on a display, wherein the one or more locations on the display are associated with one or more displayed GUI elements; and generate one or more adjustments responsive to the offset.

Embodiment 33: the system of any of Embodiments 29 to 32, further comprising a display utility configured to send visual information to an on-screen display processor responsive to the one or more adjustments.

Embodiment 34: the system of any of Embodiments 29 to 33, wherein the touch sensing sub-system is further configured to determine one or more locations at a contact-sensitive surface responsive to detected sensed touch signals, and the one or more executable instructions are adapted to enable the processor to: generate visual information comprising information representative of one or more visual indicators responsive to the one or more locations; and overlay the visual information with video information.

Embodiment 35: the system of any of Embodiments 29 to 34, further comprising a display controller configured to control a display to present the one or more visual indicators together with the activated GUI overlay.

Embodiment 36: a method, comprising: detecting sensed touch signals received from one or more touch sensors; determining touch information responsive to the detected sensed touch signals; identifying an activation event responsive to the touch information; and activating a graphical user interface (GUI) overlay responsive to the touch information.

Embodiment 37: an appliance, comprising: a housing comprising a contact-sensitive surface positioned with a rear surface of the housing; a display configured to present a graphical user interface (GUI); and a touch user-interface (UI) configured to enable interaction with the GUI presented at the display responsive to manipulation of the contact-sensitive surface.

Embodiment 38: the appliance of Embodiment 37, wherein the touch UI comprises one or more capacitive touch sensors configured to respond to contact at the contact-sensitive surface.

Embodiment 39: the appliance of Embodiments 37 and 38, wherein the appliance is one of a television or a monitor.

Embodiment 40: the appliance of any of Embodiments 37 to 39, wherein the housing is bezel-less.

I claim:

1. A display system, comprising:
   a contact-sensitive user interface located on a back surface of the display system, the contact-sensitive user interface including a proximity sensor;
   a display configured to present activatable regions of a graphical user interface (GUI) in response to the proximity sensor detecting a proximity event, the activatable regions configured to be interacted with by the contact-sensitive user interface, the activatable regions comprising one or more of: a button, a slider, a selectable pane, and a selectable menu element; and
   a display system controller configured to change settings associated with characteristics of the display system responsive to activated regions of the GUI.

2. The display system of claim 1, wherein the contact-sensitive user interface comprises a contact-sensitive surface.

3. The display system of claim 2, wherein the contact-sensitive surface is adapted to respond to at least one of physical contact of objects and proximity of objects.

4. The display system of claim 1, wherein the display is configured to present one or more activatable regions at one or more first locations on the display substantially in front of one or more second locations on the contact-sensitive user interface.

5. The display system of claim 4, wherein the one or more first locations and one or more second locations are substantially opposing each other.

6. The display system of claim 4, wherein the back surface comprises distinguishing physical topographical features substantially at the one or more second locations.

7. The display system of claim 6, wherein the distinguishing physical topographical features comprise ridging, texture, etching, depressed portions, raised portions, and combinations thereof.

8. The display system of claim 1, wherein the display is configured to present the GUI overlaid onto a video received at a video input interface of the display system.

9. The display system of claim 1, wherein the display is configured to present the GUI overlaid onto a default image indicative of no video received at a video input interface of the display system.

10. The display system of claim 1, wherein the characteristics of the display system comprise one or more of brightness, tint, resolution, color, video mode, language, screen adjustment, and input selection.

11. The display system of claim 1, further comprising an audio output, wherein at least one of the characteristics of the display system is a volume associated with the audio output.

12. The display system of claim 1, further comprising:
   a wired video input interface configured to receive video information; and
   a video processor, wherein the video processor is configured to overlay visual information associated with the graphical user interface onto video information received at the wired video input interface.

13. The display system of claim 12, wherein the wired video input interface comprises an external wired video input interface.

14. The display system of claim 1, further comprising GUI application instructions stored on a memory that, while executed by a processor, are adapted to enable the processor to generate and/or handle one or more events associated with the GUI.

15. The display system of claim 14, wherein the one or more events are associated with the activatable regions.

16. The display system of claim 15, wherein the one or more events comprise an activation event, a deactivation event, a hand position change event, a hover event, a menu change event, a button select event, a slider select event.

17. The display system of claim 1, further comprising:
   a touch sensor; and
   a touch controller configured to detect sensed touch signals received from the touch sensor and provide position information to a GUI application responsive to the detected sensed touch signals.

18. The display system of claim 17, wherein the touch controller comprises a processor and a memory having one or more instructions stored thereon that, when executed by the processor, are adapted to enable the processor to perform functions, tasks, or activities associated with the GUI application.

19. The display system of claim 17, wherein the touch controller further comprises one or more embedded units configured to perform touch detection and touch processing responsive to the sensed touch signals.

20. The display system of claim 19, wherein the touch controller comprises a microprocessor, and at least one of the one or more embedded units is configured to perform core operations without interrupting the microprocessor.

21. The display system of claim 1, further comprising a stand configured to hold the display system above a surface.

22. The display system of claim 1, wherein the display system is not configured for hand-held operation.

23. The display system of claim 1, wherein the characteristics of the display system comprise one or more of brightness, tint, resolution, color, video mode, and language.

24. A system, comprising:
   a proximity sensing sub-system configured to detect proximity of an object from a proximity sensor and determine proximity information;
   a touch sensing sub-system configured to detect sensed touch signals received from one or more touch sensors and determine touch information responsive to the detected sensed touch signals; and
   a memory and a processor, the memory having one or more executable instructions stored thereon that, while executed by the processor, are adapted to enable the processor to:
      display one or more activatable GUI elements responsive to the proximity information, the one or more activatable GUI elements comprising one or more of: a button, a slider, a selectable pane, and a selectable menu element;
      identify at least one activated GUI element of the one or more activatable GUI elements responsive to the touch information; and
      generate one or more events responsive to the identified at least one activated GUI element.

25. The system of claim 24, wherein the touch information is position information, and further wherein the one or more executable instructions are adapted to enable the processor to:
- compare the position information to stored position information that corresponds to one or more contact-sensitive buttons; and
- identify a contacted contact-sensitive button responsive to the comparison.

26. The system of claim 25, wherein the position information is indicative of a first location on a contact-sensitive surface associated with one contact sensor of the one or more contact sensors, and the contacted contact-sensitive button is associated with the first location.

27. The system of claim 26, wherein the one or more executable instructions are adapted to enable the processor to:
- compare a second position information to the stored position information that corresponds to the one or more contact-sensitive buttons; and
- identify a second contacted contact-sensitive button responsive to the comparison.

28. The system of claim 27, wherein the second position information is indicative of a second location on the contact-sensitive surface associated with the one contact sensor of the one or more contact sensors, and the second contacted contact-sensitive button is associated with the second location.

29. The system of claim 24, wherein the touch information is a touch sensor identifier, wherein the one or more executable instructions are adapted to enable the processor to:
- compare the touch sensor identifier to stored touch sensor identifiers that correspond to one or more contact-sensitive buttons; and
- identify a contacted contact-sensitive button responsive to the comparison.

30. A method, comprising:
- detecting a proximity signal received from a proximity sensor;
- determining proximity information responsive to the detected proximity signal;
- generating a display signal to display one or more activatable graphical user interface (GUI) elements on a display responsive to the determined proximity information, the one or more activatable GUI elements comprising one or more of: a button, a slider, a selectable pane, and a selectable menu element;
- detecting sensed touch signals received from one or more touch sensors;
- determining touch information responsive to the detected sensed touch signals;
- identifying at least one activated GUI element of the one or more activatable GUI elements of a display utility overlay responsive to the touch information; and
- generating one or more events responsive to the identified at least one activated GUI element.

* * * * *

UNITED STATES PATENT AND TRADEMARK OFFICE
CERTIFICATE OF CORRECTION

| | | |
|---|---|---|
| PATENT NO. | : 10,955,961 B2 | Page 1 of 1 |
| APPLICATION NO. | : 16/001689 | |
| DATED | : March 23, 2021 | |
| INVENTOR(S) | : Lowry DuRant Lewis | |

It is certified that error appears in the above-identified patent and that said Letters Patent is hereby corrected as shown below:

In the Specification

Column 6,   Line 65,   change "cap-touch buttons 306." to
--contact-sensitive buttons 306.--

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*